United States Patent [19]

Scholta

[11] Patent Number: 5,279,082
[45] Date of Patent: Jan. 18, 1994

[54] MOLDED ELEMENT

[76] Inventor: Winfried E. Scholta, 32 Kreuzstrasse, 6730 Neustadt 21, Fed. Rep. of Germany

[21] Appl. No.: 748,890

[22] Filed: Aug. 23, 1991

[30] Foreign Application Priority Data

Aug. 30, 1990 [DE] Fed. Rep. of Germany ....... 4027517

[51] Int. Cl.⁵ ............................................. E04C 1/00
[52] U.S. Cl. ......................................... 52/610; 52/604; 52/605; 52/607; 52/606; 52/608; 405/284
[58] Field of Search ........ 47/33; 83; 52/610, 604–608; 405/284, 286

[56] References Cited

U.S. PATENT DOCUMENTS

| 1,649,780 | 11/1927 | Robbins | 52/604 |
| 2,662,343 | 12/1953 | Rice | 47/33 |
| 2,847,848 | 8/1958 | Grants | 52/605 |
| 2,911,794 | 11/1959 | Pearson | 47/33 X |
| 2,932,745 | 4/1960 | Alberti et al. | 52/608 |
| 2,960,797 | 11/1960 | Frehner | 47/83 X |
| 3,444,694 | 5/1969 | Frehner | 47/33 X |
| 4,048,772 | 9/1977 | Gaul | 52/610 |
| 4,244,665 | 1/1981 | Neumann | 47/83 X |
| 4,557,634 | 12/1985 | Vidal | 47/83 X |

FOREIGN PATENT DOCUMENTS

| 3316791 | 11/1984 | Fed. Rep. of Germany | 47/83 |
| 3415911 | 10/1985 | Fed. Rep. of Germany | 47/83 |
| 0461331 | 8/1950 | Italy | 52/610 |
| 0637630 | 4/1962 | Italy | 52/610 |
| 0673717 | 11/1964 | Italy | 52/800 |
| 9001597 | 2/1990 | World Int. Prop. O. | 47/83 |

Primary Examiner—Carl D. Friedman
Assistant Examiner—Robert Canfield
Attorney, Agent, or Firm—Oblon, Spivak, McClelland, Maier & Neustadt

[57] ABSTRACT

A molded base element includes a base element body having a substantially rhomboid longitudinal sectional shape and formed of two side walls intersecting one another along a longitudinal direction. Each of the side walls extends between longitudinally spaced cut surfaces and has a base surface adjacent a free end thereof opposite the intersection of the side walls. Slots or holes can be formed at the flattened surface at the line of intersection. Alternatively, grooves can be formed on the inner or end surfaces of the walls.

13 Claims, 6 Drawing Sheets

FIG.5
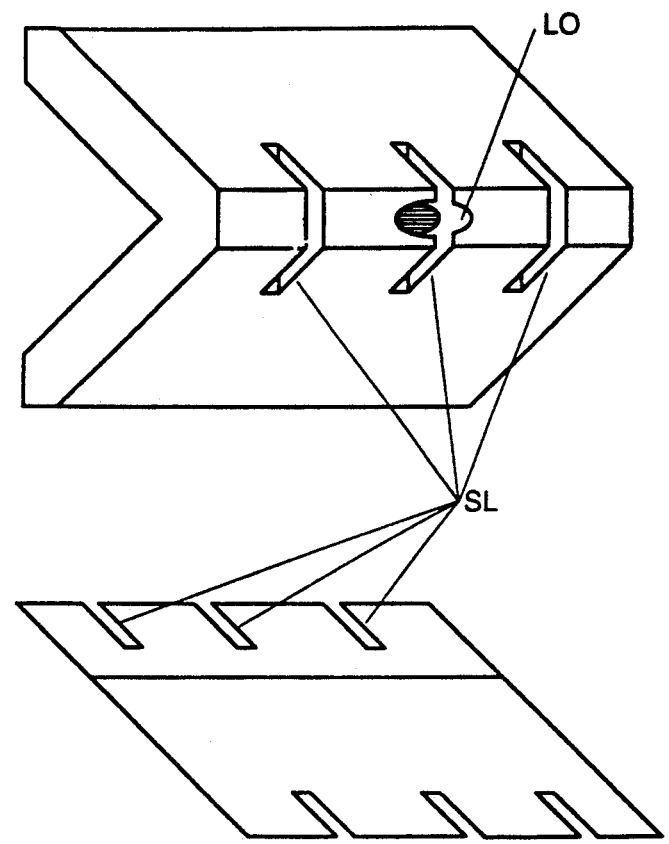
(A)
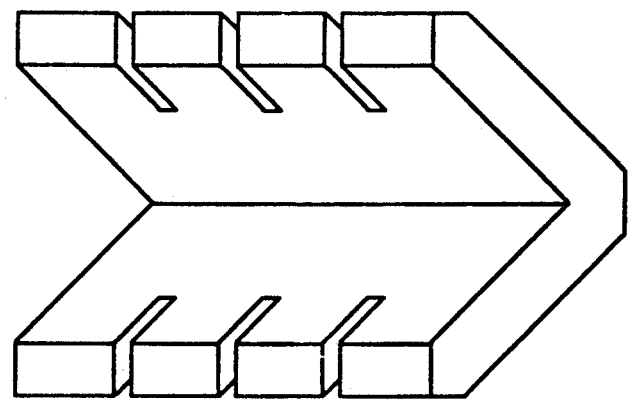
(B)

MOLDED ELEMENT

BACKGROUND OF THE INVENTION

1. Field of the Invention

The present invention relates to a molded structural element for consolidating soils, making them capable of being walked on and driven on and for holding earth and other substrates in a horizontal to vertical arrangement, in particular, for the purpose of planting.

2. Description of the Related Art

There are many molded blocks for the covering consolidation of substrates. All are laid with joints, inter alia for the purpose of drainage. Plants cannot flourish here or are undesirable. The soils present underneath become compacted at the points of continuous load and are virtually completely unable to breathe. Water no longer penetrates deeply and is removed by means of an elaborate drainage system.

Meadows or lawns absorb water like a sponge and release it slowly downward. Plants and soil animals survive well here. Walking and driving is possible in the dry state but only to a limited extent in the wet state. The plants are damaged, depending on the load.

Molded lattice-type blocks for lawns can help to solve the problem of load-bearing capacity and suitability for planting. They differ in shape and material, and water seeps into their cavities, the soil breathes and soil fauna and flora find space for living, taking root and growing.

However, a disadvantage here is that virtually all these molded blocks have side walls and orifices at right angles to the substrate. In the case of high traffic loads, this molded block is subjected to loads at certain points and is pressed further and further into the soil, owing to the lack of a lateral bond. The substrate squeezes upward out of the cavities and is recompacted there. The resulting situation is similar to that in the case of the covering molded blocks. Furthermore, these molded blocks are generally used only for the same purpose.

SUMMARY OF THE INVENTION

It is an object of the present invention to provide a structural element which minimizes the abovementioned disadvantages, requires less material, is easy to process and is substantially more versatile and flexible in use.

We have found that this object is achieved by a molded element, which comprises a base element body which is open on one side, limited by side walls, rhomboid or rhomboid-like in longitudinal section and polygonal and/or arc-shaped in cross-section.

The opposite outer surfaces of the free side wall ends form a right angle with their adjacent base surfaces.

One or more slots are formed in each base surface of the free side wall ends, transverse to the longitudinal direction and parallel to one of the two cut surfaces.

The upper surface of the closed element side is flattened parallel to the base surfaces of the side walls.

One or more slots and/or holes are formed in the upper surface of the closed element side, transverse to the longitudinal direction and parallel to one of the two planes of section, the slots being flush with the opposite slots of the base surfaces.

The rhomboid shape in longitudinal section according to the invention has substantial advantages over rectangular shapes.

With the same material consumption, the loaded contact surface and the contact surface which relieves the load on the soil side are substantially enlarged as a result of the oblique plane of section, depending on the wall thickness.

On laying, the oblique upper half of the closed element side of each molded block furthermore rests on an open, oblique side wall base surface of the adjacent molded block. Consequently, all molded blocks have a laterally supporting bond to one another and load distribution between one another.

Finally, as a result of the inner or outer surfaces of the element side wall which are inclined with respect to every direction of pressure, all downward forces or substrate pressing upward are/is additionally distributed or removed.

When the molded blocks are laid, appropriately formed connecting elements can be inserted into the orifices formed according to the invention in base and upper surfaces, depending on the expected load. They fit into the orifices of the adjacent molded block which are opposite them when laid and thus connect outer, base and upper surfaces of all molded blocks to one another to form a total surface having an even greater load-bearing capacity.

According to the invention, grooves may be formed in the two inner surfaces of the side walls. In flat areas subject to a particularly heavy load, they are used for holding triangular moldings, with the result that the contact surface facing the soil can be additionally enlarged and an inner half nevertheless remains open. In inclined soil areas, these moldings are correspondingly lengthened on the side facing the soil, for better anchoring of the molded blocks in the soil.

According to the invention, grooves which run along the middle of the wall can be formed in the front and back cut or end surfaces of the molded block. They are used for holding sealing elements when, in particular applications, the end faces must be bonded tightly to one another.

As a result of the symmetry, according to the invention, of the molded block, it fits on all sides together with the corresponding surfaces of the opposite molded block, which surfaces are rotated if necessary. For reasons relating to efficient production, it is also possible for two or more identical individual modules to be molded firmly together to give a shaped composite element meeting the particular requirements.

A wider load distribution is permitted essentially by the rhomboid shape in the longitudinal direction and the load surface of the molded block, which surface is inclined with respect to the contact surface.

This load distribution is further increased by the laterally mutually supporting bond between all molded blocks.

The possibility of firm but always detachable intermeshing of the elements with one another by connecting elements or the anchoring in the ground permitted by the insertion of appropriate moldings, ensures maximum possible efficiency on flat and steep to vertical surfaces.

Furthermore, the dimensions of this molded base module are also variable. This gives rise to potential applications in very different locations.

Owing to the sum of individual or all points mentioned above, it is possible, by virtue of the higher utilization ratio, to manage with considerably less material, which can reduce the production cost and the sale price. In addition to lower transport costs, the lower weight also facilitates the strenuous laying work. Lighter elements can be laid more quickly. This also reduces labor costs.

Efficient production of relatively large composite forms of identical molded base elements in line with requirements may permit further cost reductions.

Finally, however, a larger planting area is provided as a result of the smaller wall thicknesses. The soil fauna can flourish again. The flora can grow more readily in the inclined earth chambers with the maximum possible protection from soil compaction. With tree rings composed of these elements, diseased trees along traffic routes recover again. The larger area can breathe better. Owing to the inclined water removal in porous earth, the soil more readily absorbs to its full capacity and regulates the vital moisture balance. The present invention thus also serves especially for nature conservation.

If, in addition to the conventional building materials, the elements are produced from recycled, low-value waste plastics, they can make a not insignificant contribution to the elimination of the waste mountain and toward relieving the landfills, in addition to the above-mentioned possibilities, as a result of the generally high demand for molded blocks for soil covering and the corresponding material requirement.

BRIEF DESCRIPTION OF THE DRAWINGS

The present invention is illustrated with reference to the following drawings.

FIG. 5 shows a plan view of the closed element side of a molded block having formed slots and a hole.

FIG. 5a shows a view of the rhomboid lateral surface of a molded block having formed slots on base and upper surfaces FIG. 5b shows a view of a molded block from below, i.e. from the open element side, having formed slots.

FIG. 6a shows a view of the front plane of section of a molded block having a formed groove on the end face.

FIG. 6b shows a view of the rhomboid lateral surface of a molded block with the possibility for forming a cross-section of a formed groove in the planes of section.

DETAILED DESCRIPTION OF THE PREFERRED EMBODIMENT

Referring to the embodiment of FIGS. 1-4, a base element body of the molded base element according to the present invention is comprised of a molded block having side walls S1 and S2, the side walls intersecting at a flattened surface OS1. The base element body has a substantially rhomboid longitudinal sectional shape and a polygonal or arc shaped cross section, and the side walls extend between longitudinally spaced cut surfaces SF1 and SF2. Each of the walls S1 and S2 terminates at a base surface US1 and US2 opposite the flattened surface OS1.

The embodiment of FIGS. 5, 5a and 5b differs from the first embodiment in that slots SL and opening LO are formed in the flattened surface OS1 and extend transverse to the longitudinal direction and parallel to the cut surfaces.

Figure 1:
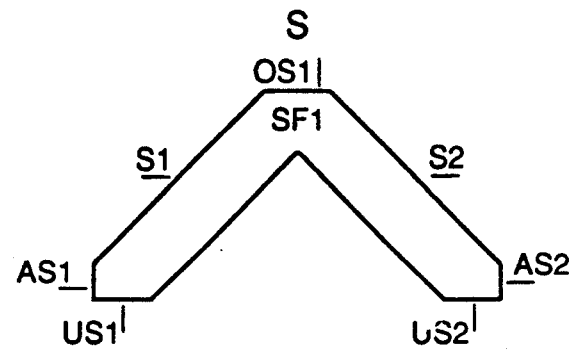
FIG. 1 shows a view of the front cut surface of a molded block.
Figure 2:
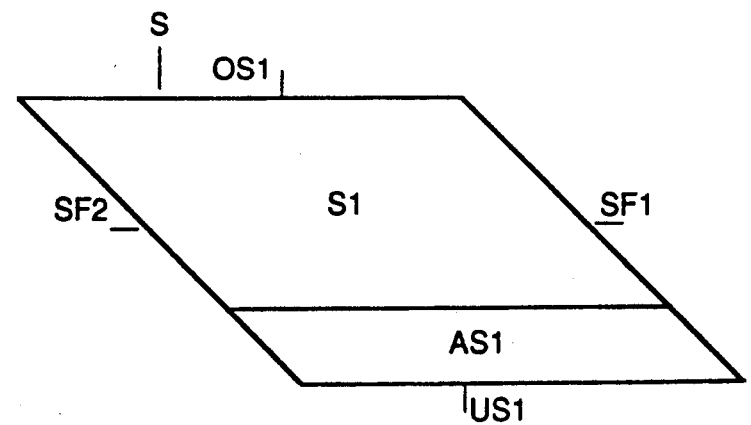
FIG. 2 shows a view of the rhomboid lateral surface of a molded block.
Figure 3:
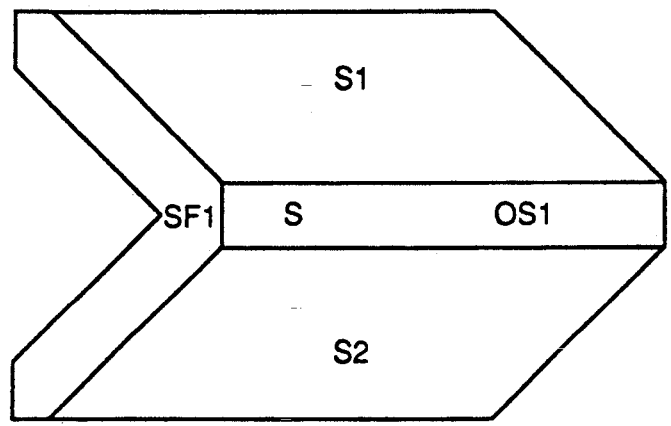
FIG. 3 shows a plan view of the closed element side of a molded block.
Figure 4:
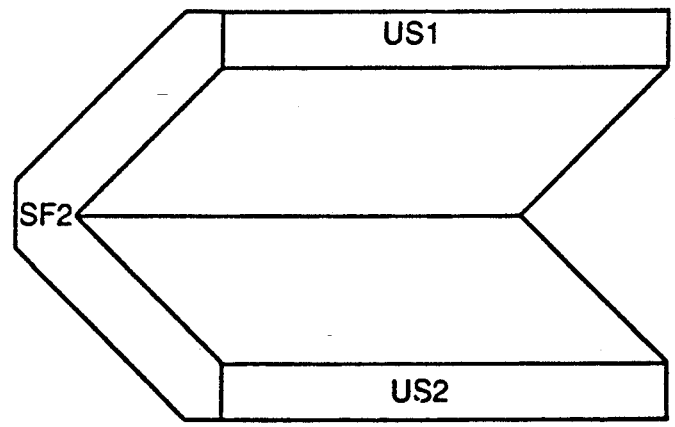
FIG. 4 shows a view of a molded block from below, i.e. from the open element side.
Figure 6:
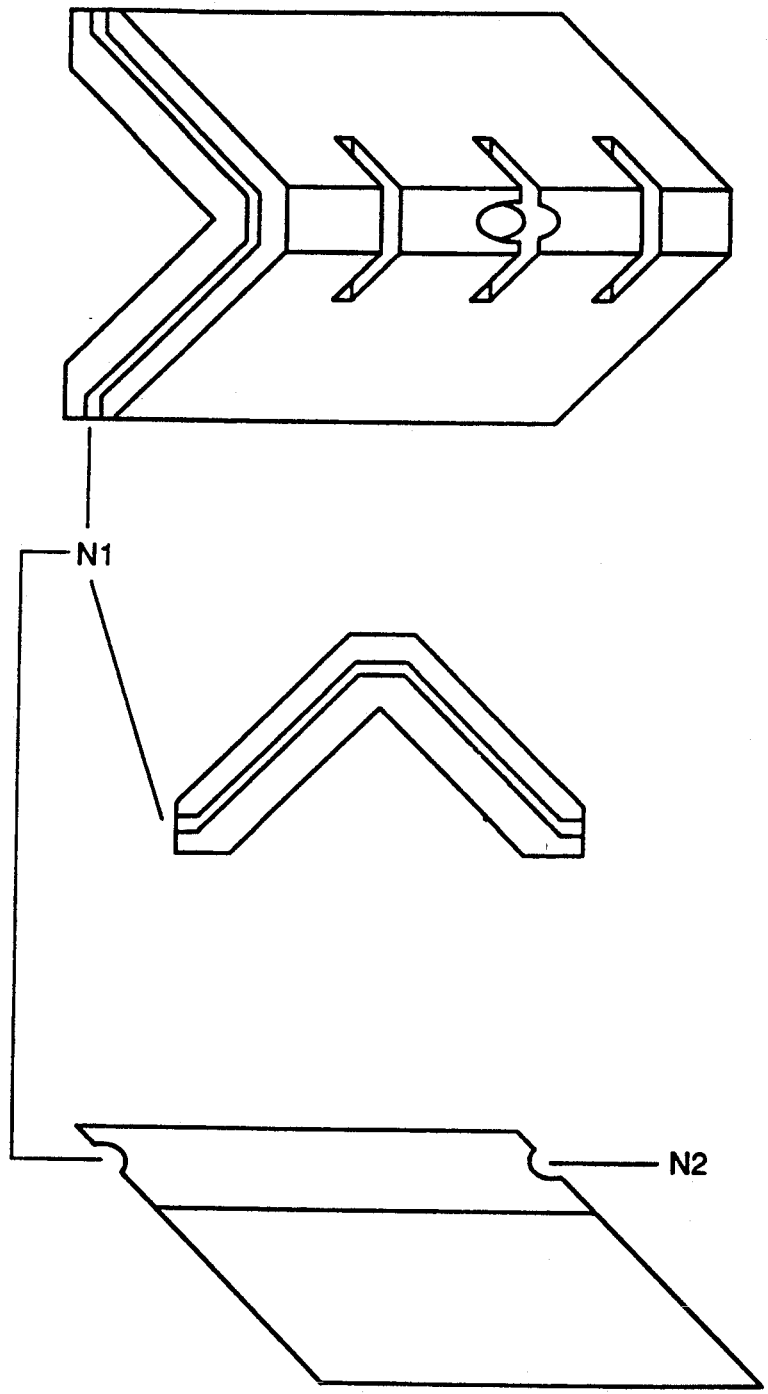
FIG. 6 shows a plan view of the closed element side of a molded block having formed slots and a hole and a formed groove on the end face.

The embodiment of FIGS 6, 6a and 6b is similar to that of FIG. 5, except that it also includes a continuous central groove N1 or N2 that runs along the length of each of the cut surfaces.

Figure 7:
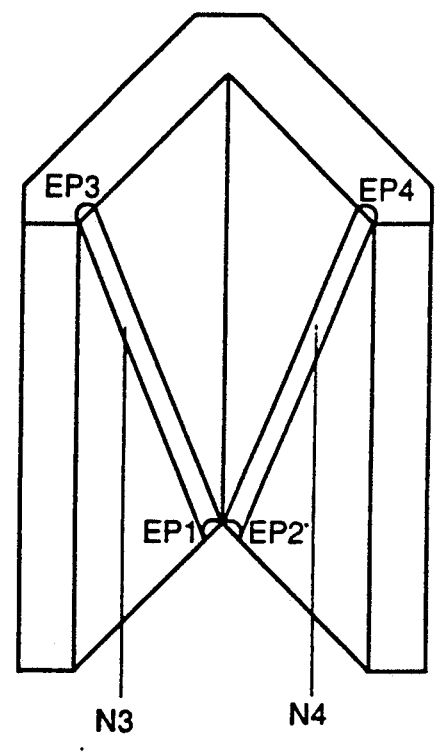
FIG. 7 shows a view of a molded block from below, i.e. from the open element side having formed grooves in the inner surface.

In FIG. 7, continuous grooves N3 and N4 extend along the inner surface of each of the walls from a location EP1 or EP2 and one of the cut surfaces adjacent the intersection of the side walls to a location EP3 or EP4 at the other of the cut surfaces adjacent the free end.

Figure 8:
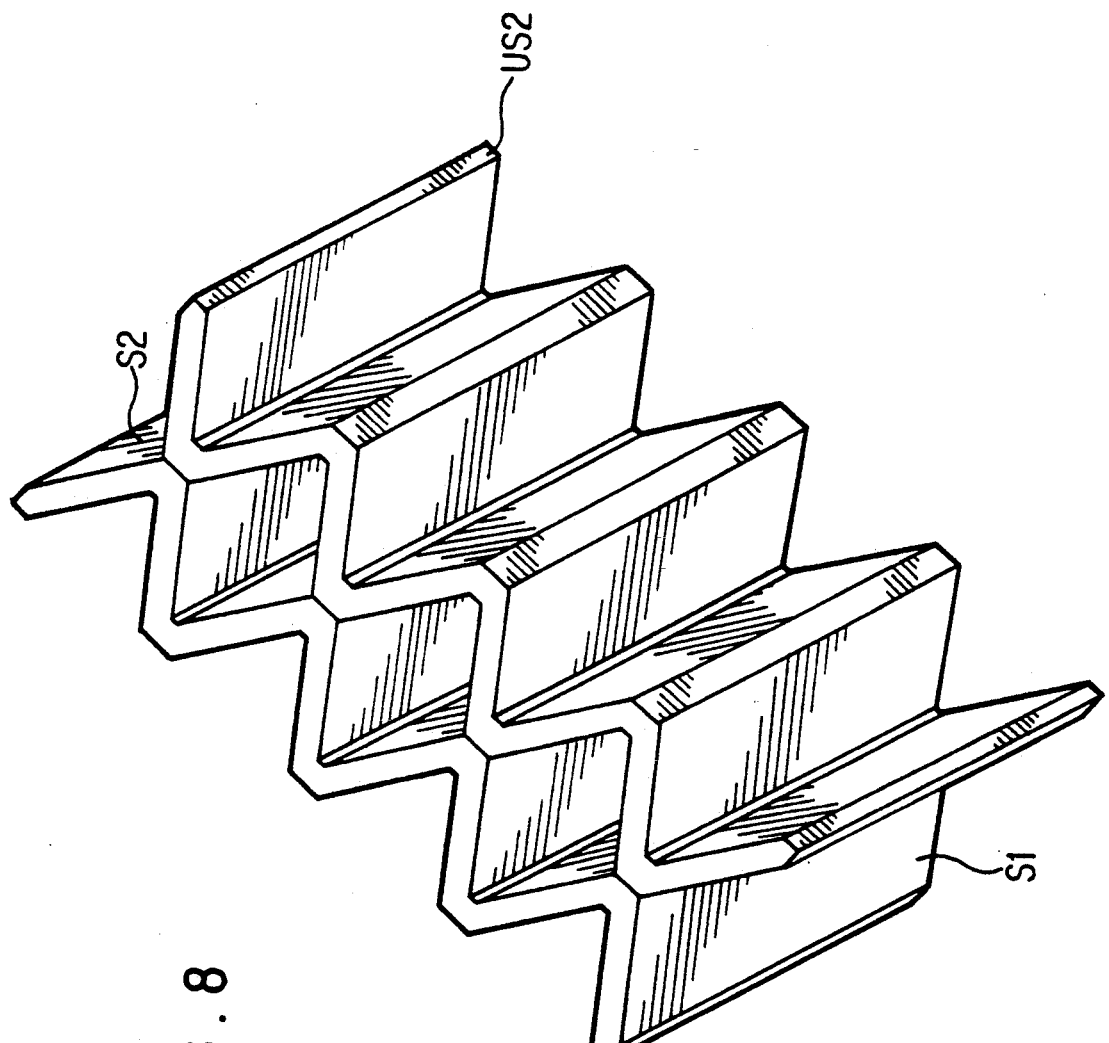
FIG 8 shows two adjacent molded blocks.

When laying the elements of the present invention, the oblique upper half of each molded block rests on an open, oblique side wall base surface US2 of the adjacent molded block (FIG. 8). Consequently, all molded blocks have a laterally supporting bond to one another and load distribution between one another.

As a result of the inner and outer surfaces of the element side wall S1 or S2, which are inclined with respect to every direction of pressure, all downward forces or substrate pressing upward are/is additionally distributed or removed.

When the molded blocks are laid, appropriately formed connecting elements can be inserted into the orifices LO. They fit into the orifices of the adjacent molded blocks which are opposite them when laid and thus connect outer, base and upper surfaces of all molded blocks to one another to form a total surface having an even greater load bearing capacity.

I claim:

1. A plurality of molded base elements for consolidating soils, each of said base elements comprising a base element body which is open at one side and limited by side walls, said body having a substantially rhomboid longitudinal sectional shape and a polygonal or arc shaped cross-section wherein a closed oblique upper half of each base element rests on an open oblique side wall base surface of an adjacent molded element, whereby said molded elements have a laterally supported bond to one another.

2. A molded base element comprising:
   a base element body having a substantially rhomboid longitudinal sectional shape and formed of two side walls intersecting one another along a longitudinal direction, each of said side walls extending between longitudinally spaced cut surfaces, each said side wall further having a free end opposite the intersection of side walls and having a base surface adjacent said free end thereof; and
   at least one slot formed at the free end of each of said side walls, said slots extending from the face surface, transverse to the longitudinal direction and parallel to the cut surface.

3. The molded base element of claim 2 wherein the free ends of each of said side walls form a right angle with an adjacent base surface.

4. The molded base element of claim 2 including a flattened surface at the intersection of said side walls and extending along the longitudinal direction.

5. The molded base element of claim 2 in combination with at least one other molded base element to form a molded structural element.

6. A molded base element comprising:
 a base element body having a substantially rhomboid longitudinal sectional shape and formed of two side walls intersecting one another at a flattened surface extending along a longitudinal direction, each of said side walls extending between longitudinally spaced cut surfaces; and
 at least one of a slot and a hole formed on the flattened surface, and extending transverse to the longitudinal direction and parallel to the cut surfaces.

7. The molded base element of claim 6 in combination with at least one other molded base element to form a molded structural element.

8. A molded base element comprising:
 a base element body having a substantially rhomboid longitudinal sectional shape and formed of two side walls intersecting one another along a longitudinal direction, each of said side walls extending between longitudinally space cut surfaces and having inner and outer surfaces, each side walls further having free ends opposite the intersection of the side walls; and
 a continuous groove formed in the inner surface of each of said side walls, each said groove extending from one of the cut surfaces adjacent the intersection of the side walls to the other of the cut surfaces adjacent the free end.

9. The molded base element of claim 8 wherein the free ends of each of said side walls form a right angle with an adjacent base surface.

10. The molded base element of claim 8 including a flattened surface at the intersection of said side walls and extending along the longitudinal direction.

11. The molded base element of claim 8 in combination with at least one other molded base element to form a molded structural element.

12. A molded base element comprising:
 a base element body having a substantially rhomboid longitudinal sectional shape and formed of two side walls intersecting one another along a longitudinal direction, each of said side walls extending between longitudinally space cut surfaces; and
 a continuous central groove running along the length of each of said cut surfaces.

13. The molded base element of claim 12 in combination with at least one other molded base element to form a molded structural element.

* * * * *